(12) United States Patent
Zhu et al.

(10) Patent No.: US 12,543,248 B1
(45) Date of Patent: Feb. 3, 2026

(54) FLEXIBLE HEATING DEVICE

(71) Applicant: Zhongshan Victoria's Secret Life Appliances Technology Co., Ltd., Zhongshan (CN)

(72) Inventors: Qiaomin Zhu, Zhongshan (CN); Shengjie Zhu, Zhongshan (CN)

(73) Assignee: Zhongshan Victoria's Secret Life Appliances Technology Co., Ltd., Zhongshan (CN)

( * ) Notice: Subject to any disclaimer, the term of this patent is extended or adjusted under 35 U.S.C. 154(b) by 0 days.

(21) Appl. No.: 19/250,268

(22) Filed: Jun. 26, 2025

(30) Foreign Application Priority Data

Jul. 31, 2024 (CN) .......................... 202421845995.7
Dec. 11, 2024 (CN) .......................... 202423059124.5

(51) Int. Cl.
*H05B 3/36* (2006.01)
*H05B 3/14* (2006.01)

(52) U.S. Cl.
CPC .............. *H05B 3/36* (2013.01); *H05B 3/148* (2013.01); *H05B 2203/003* (2013.01)

(58) Field of Classification Search
CPC ..... H05B 3/36; H05B 3/148; H05B 2203/003
See application file for complete search history.

(56) References Cited

U.S. PATENT DOCUMENTS

| | | | |
|---|---|---|---|
| 4,065,660 A * | 12/1977 | Berard | A47J 36/2433 219/535 |
| 11,558,935 B2 | 1/2023 | Tong et al. | |
| 11,849,511 B2 | 12/2023 | Tong et al. | |
| 2001/0050005 A1* | 12/2001 | Wang | A47J 27/004 99/422 |
| 2010/0116818 A1* | 5/2010 | Gabbay | H05B 6/36 219/528 |
| 2012/0234819 A1* | 9/2012 | Berger | B61D 27/0045 219/213 |
| 2023/0000667 A1 | 1/2023 | Patton et al. | |

* cited by examiner

*Primary Examiner* — Edward F Landrum
*Assistant Examiner* — Kuangyue Chen
(74) *Attorney, Agent, or Firm* — Ricky Lam

(57) ABSTRACT

A flexible heating device includes a flexible heating plate, an electric heating appliance and a power supply connecting module; the flexible heating plate includes a silicone pad, an electric connecting base and a first electric heating wire; the electric connecting base and the first electric heating wire are fixed to the silicone pad, the silicone pad is provided with a heating area and an appliance area, the electric connecting base is located in the appliance area, the first electric heating wire is located in the heating area, the electric heating appliance is detachably in butt joint with the electric connecting base and is electrically connected to the electric connecting base, the power supply connecting module is arranged on one side of the flexible heating plate and is electrically connected to the first electric heating wire and the electric connecting base. The device integrates heat preservation and cooking.

18 Claims, 14 Drawing Sheets

FLEXIBLE HEATING DEVICE

FIELD OF THE INVENTION

The present application relates to the technical field of household appliances, and specifically relates to a flexible heating device.

BACKGROUND OF THE INVENTION

A flexible heating device can be powered on to produce heat through electric heating wires inside so as to heat up meals in cold weather or in specific scenarios, and because the flexible heating device has the characteristics of being lightweight, flexible and foldable, it is deeply loved by consumers.

An existing flexible heating device has simple function and can only be used for keeping meals warm, and cannot meet the diverse use needs of users in various scenarios.

Therefore, it is necessary to propose a novel technical solution to solve the above-mentioned technical problems.

SUMMARY OF THE INVENTION

The present application aims to provide a flexible heating device having both the functions of heat preservation and cooking.

In order to solve the above technical problem, the technical scheme adopted in the present application is as follows:

The present application provides a flexible heating device, comprising:
- a flexible heating plate comprising a silicone pad, an electric connecting base and a first electric heating wire, wherein the electric connecting base and the first electric heating wire are fixed to the silicone pad, the silicone pad is provided with a heating area and an appliance area, the electric connecting base is located in the appliance area, and the first electric heating wire is located in the heating area;
- an electric heating appliance which is detachably in butt joint with the electric connecting base and is electrically connected to the electric connecting base; and
- a power supply connecting module which is arranged on one side of the flexible heating plate and is electrically connected to the first electric heating wire and the electric connecting base.

Further, the silicone pad comprises a silicone layer and first convex ribs, the first convex ribs are formed on the bottom surface of the silicone layer and cover the outer side of the first electric heating wire, and the silicone layer and the first convex ribs are integrally molded.

Further, the first electric heating wire is integrally molded and fixed to the silicone pad by mold pressing, and the first convex rib is formed by integrally hot-pressing the first electric heating wire on the bottom surface of the silicone layer through mold pressing.

Further, the silicone pad further comprises supporting legs which are arranged on the bottom surface of the silicone layer.

Further, the height of the supporting legs protruding out of the silicone layer is larger than that of the first convex ribs protruding out of the silicone layer.

Further, the electric heating appliance comprises a heat insulation protection shell, and an electric heating inner container which is mounted on the heat insulation protection shell, the heat insulation protection shell is provided with a socket which is detachably connected to the electric connecting base; and when the electric heating appliance is plugged in the electric connecting base, the electric heating inner container is electrically connected to the electric connecting base.

Further, a heat dissipation cavity is formed in the heat insulation protection shell and is located between the bottom of the heat insulation protection shell and the bottom of the electric heating inner container, and air holes are formed in the side wall of the heat dissipation cavity.

Further, the bottom surface of the heat insulation protection shell is made of a plastic material, and the bottom surface of a part, located in the appliance area, of the silicone layer is a plane.

Further, the power supply connecting module comprises a shell, a power interface and a temperature control assembly; the temperature control assembly is mounted on the shell; the power interface is arranged on the shell and electrically connected to the temperature control assembly; and the temperature control assembly is electrically connected to the first electric heating wire and the electric connecting base.

Further, the temperature control assembly comprises a first temperature control knob, a first display screen, a second temperature control knob and a second display screen; and the first temperature control knob is electrically connected to the first display screen, the second temperature control knob is electrically connected to the second display screen, the first temperature control knob is electrically connected to the first electric heating wire, and the second temperature control knob is electrically connected to the electric connecting base.

Further, the silicone pad is provided with an installation hole and a wiring channel, the electric connecting base is fixedly installed in the installation hole, and the wiring channel is arranged between the installation hole and the shell.

Further, a connection ring is formed on the side, close to the shell, of the silicone pad; the connection ring is located in the shell and is arranged corresponding to a screw hole in the shell; and the shell and the connection ring are fixedly connected by a screw.

Further, the shell is further provided with a handle groove which penetrates through the shell.

Further, the heating area is located between the appliance area and the power supply connecting module.

Further, the heating area is located on the side, away from the power supply connecting module, of the appliance area.

Further, the heating area surrounds the appliance area.

Further, the flexible heating plate further comprises a second electric heating wire which is fixed to the silicone pad and located in the appliance area, and the second electric heating wire is electrically connected to the electric connecting module.

Further, the flexible heating plate further comprises a temperature sensing element which is installed on the silicone pad and is connected to the first electric heating wire.

Further, second convex ribs are arranged on the bottom surface of the silicone layer and wrap the outer side of the temperature sensing element; and the second convex ribs and the silicone layer are integrally molded.

Further, a separation protrusion is further arranged on the surface, facing the electric heating appliance, of the silicone pad, and the separation protrusion is located at a junction of the heating area and the appliance area.

In the present application, the heating area and the appliance area are arranged on the silicone pad, the first electric heating wire is arranged in the heating area, and the electric connecting base is arranged in the appliance area, so that the heating area of the silicone pad can be used for heating meals and preserve heat of meals; when the electric heating appliance is placed in the appliance area and is electrically connected to the electric connecting base, the flexible heating plate can heat the electric heating appliance, therefore, the flexible heating device can be used for preserving heat and cooking, which achieves the heat preservation and cooking functions of the flexible heating device; and moreover, the two functions are set in a partitioned mode, and the first electric heating wire and the electric connecting base are electrically connected to the power supply connecting module respectively, so that the heat preservation function and cooking function of the flexible heating device are independently performed and do not interfere with each other, which improves the practicality and convenience of the flexible heating device.

Figure 1:
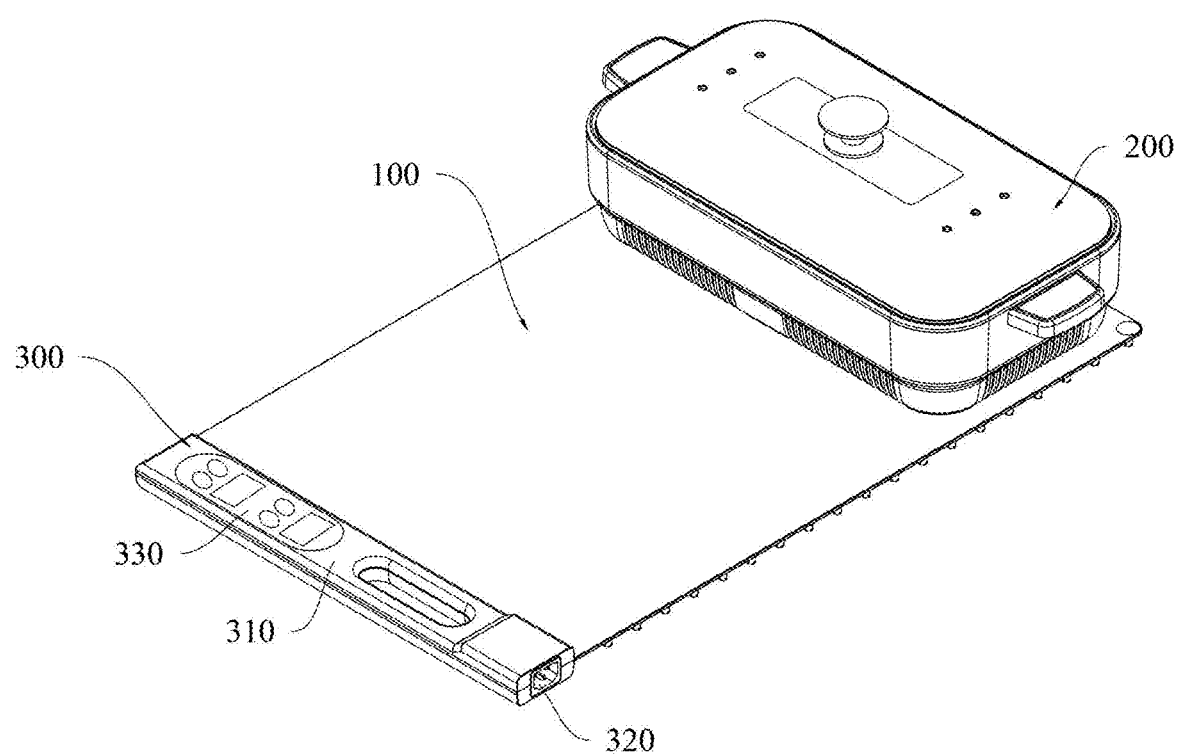
FIG. 1 is a schematic diagram of an Embodiment 1 of a flexible heating device provided by the present application.
Figure 2:
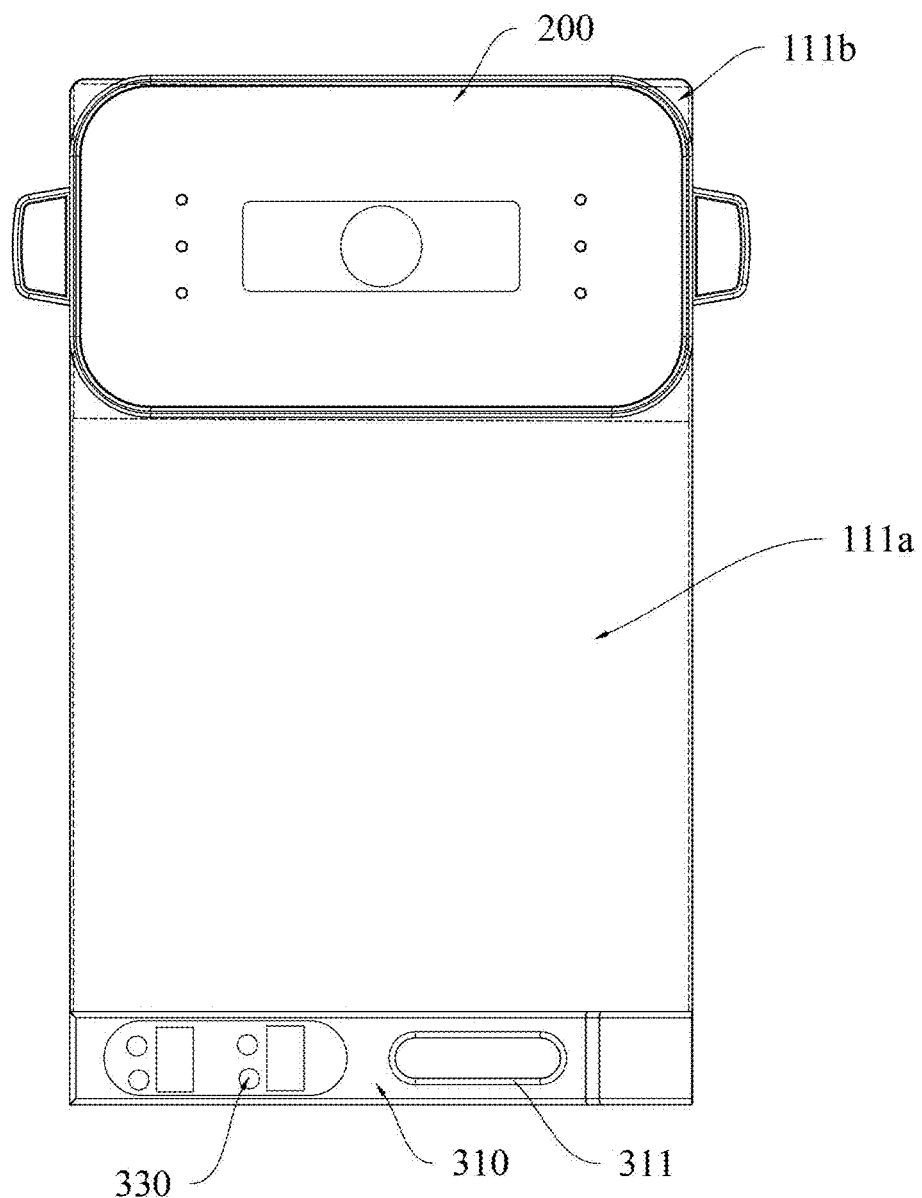
FIG. 2 is a top view of a flexible heating device shown in FIG. 1.

REFERENCE NUMERALS 100, flexible heating plate; 110, silicone pad; 111a, heating area; 111b, appliance area; 111c, wiring area; 112, silicone layer; 113, first convex rib; 114, supporting leg; 115, installation hole; 116, wiring channel; 117, connection ring; 118, second convex rib; 1191, separation protrusion; 1192, corner reinforcing rib; 120, electric connecting base; 130, first electric heating wire; 140, second electric heating wire; 150, temperature sensing element;
200, electric heating appliance; 210, heat insulation protection shell; 211, heat dissipation cavity; 212, air hole; 220, electric heating inner container;
300, power supply connecting module; 310, shell; 311, handle groove; 320, power interface; 330, temperature control assembly; 331, first temperature control knob; 332, first display screen; 333, second temperature control knob; and 334, second display screen.

DETAILED DESCRIPTION OF SOME EMBODIMENTS

The meanings of the terms used in this description and claims correspond to those normally understood by those of ordinary skill in the art to which the application belongs. The terms used in this description and claims are for the purpose of facilitating the description and understanding of the present application only and are not intended to limit the present application to a narrow interpretation of the specific terms used in the description and claims.

Refer to FIG. 1 to FIG. 12, the present application provides a flexible heating device, which specifically includes a flexible heating plate 100, an electric heating appliance 200 and a power supply connecting module 300.

The flexible heating plate 100 includes a silicone pad 110, an electric connecting base 120 and a first electric heating wire 130, in which, the electric connecting base 120 and the first electric heating wire 130 are both fixed to the silicone pad 110, the silicone pad 110 is provided with a heating area 111a and an appliance area 111b, the electric connecting base 120 is located in the appliance area 111b, and the first electric heating wire 130 is located in the heating area 111a. The electric heating appliance 200 is detachably in butt joint with the electric connecting base 120, and the electric heating appliance 200 is electrically connected to the electric connecting base 120. The power supply connecting module 300 is arranged on one side of the flexible heating plate 100, and is electrically connected to the first electric heating wire 130 and the electric connecting base 120 respectively.

According to the present application, the heating area 111a and the appliance area 111b are arranged on the silicone pad 110, the first electric heating wire 130 is arranged in the heating area 111a, and the electric connecting base 120 is arranged in the appliance area 111b, so that the heating area 111a of the silicone pad 110 can be used for heating meals and preserve heat of meals; when the electric heating appliance 200 is placed in the appliance area 111b and is electrically connected to the electric connecting base 120, the flexible heating plate 100 can heat the electric heating appliance 200, therefore, the flexible heating device can be used for preserving heat and cooking, which achieves the heat preservation and cooking functions of the flexible heating device; and moreover, the two functions are set in a partitioned mode, and the first electric heating wire 130 and the electric connecting base 120 are electrically connected to the power supply connecting module 300 respectively, so that the heat preservation function and cooking function of the flexible heating device are independently performed and do not interfere with each other, which improves the practicality and convenience of the flexible heating device.

In order to enable those skilled in the art to better understand the solution of the present application, the technical solution in the embodiment of the present application will be clearly and completely described below in conjunction with the accompanying drawings.

Embodiment 1 of Flexible Heating Device in the Present Application

As shown in FIG. 1 to FIG. 8, this embodiment provides a flexible heating device, which specifically includes a flexible heating plate 100, an electric heating appliance 200 and a power supply connecting module 300.

The flexible heating plate 100 includes a silicone pad 110, an electric connecting base 120 and a first electric heating wire 130, in which, the electric connecting base 120 and the first electric heating wire 130 are both fixed to the silicone pad 110, the silicone pad 110 is provided with a heating area 111a and an appliance area 111b, the electric connecting base 120 is located in the appliance area 111b, and the first electric heating wire 130 is located in the heating area 111a. The electric heating appliance 200 is detachably in butt joint with the electric connecting base 120, and the electric heating appliance 200 is electrically connected to the electric connecting base 120. The power supply connecting module 300 is arranged on one side of the flexible heating plate 100, and is electrically connected to the first electric heating wire 130 and the electric connecting base 120 respectively.

According to this embodiment, the heating area 111a and the appliance area 111b are arranged on the silicone pad 110, the first electric heating wire 130 is arranged in the heating area 111a, and the electric connecting base 120 is arranged in the appliance area 111b, so that the heating area 111a of the silicone pad 110 can be used for heating meals and preserve heat of meals; when the electric heating appliance 200 is placed in the appliance area 111b and is electrically connected to the electric connecting base 120, the flexible heating plate 100 can heat the electric heating appliance 200, therefore, the flexible heating device can be used for preserving heat and cooking, which achieves the heat preservation and cooking functions of the flexible heating device; and moreover, the two functions are set in a partitioned mode, and the first electric heating wire 130 and the electric connecting base 120 are electrically connected to the power supply connecting module 300 respectively, so that the heat preservation function and cooking function of the flexible heating device are independently performed and do not interfere with each other, which improves the practicality and convenience of the flexible heating device.

In some embodiments, the electric heating appliance 200 can be one of an electric saucepan, a health-preserving kettle, an electric heating kettle, an electric stir-frying pan and an electric frying pan.

In the embodiment, the electric heating appliance 200 is the electric frying pan.

In the embodiment, a first electric heating wire 130 is arranged at the part of a heat production area of the silicone pad 110, the first electric heating wire 130 is electrically connected to an external power supply by the power supply connecting module 300 to produce heat, the heat is conducted to meals or other articles needing to be heated in the heating area by the silicone pad 110, thus the effects of heat preservation and heating are achieved, and a user can enjoy palatable meals in low-temperature weather.

The electric connecting base 120 is arranged at the part of the appliance area 111b of the silicone pad 110; when being placed in the appliance area 111b, the electric heating appliance 200 can be in butt joint with the electric connecting base 120 and achieves electric connection, the electric connecting base 120 is electrically connected to the external power supply by means of the power supply connecting module 300, the electric heating appliance 200 can heat food materials or water in the appliance, thus achieving the cooking function.

Figure 7:
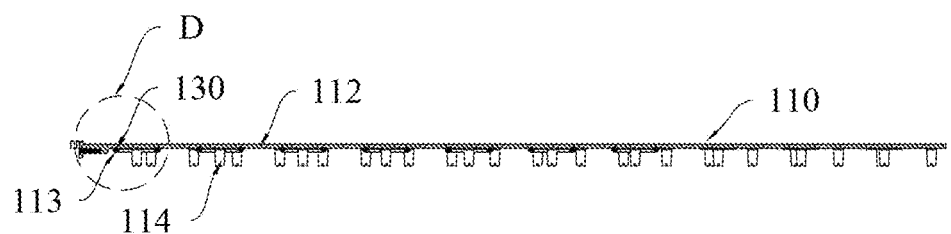
FIG. 7 is a sectional view of a flexible heating plate in a flexible heating device shown in FIG. 1.
Figure 8:
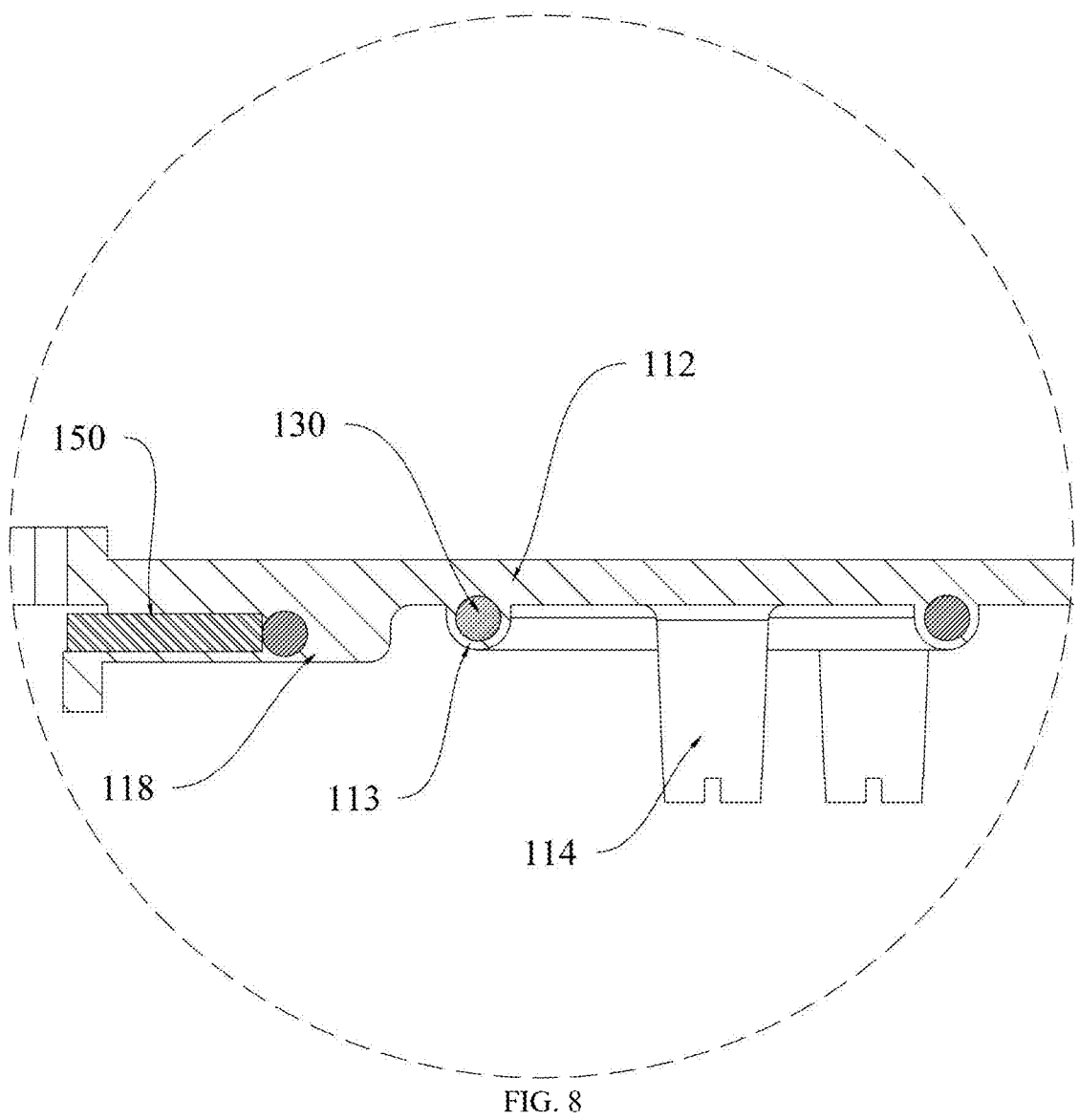
FIG. 8 is a local amplification diagram of a part D in FIG. 7.
Figure 9:
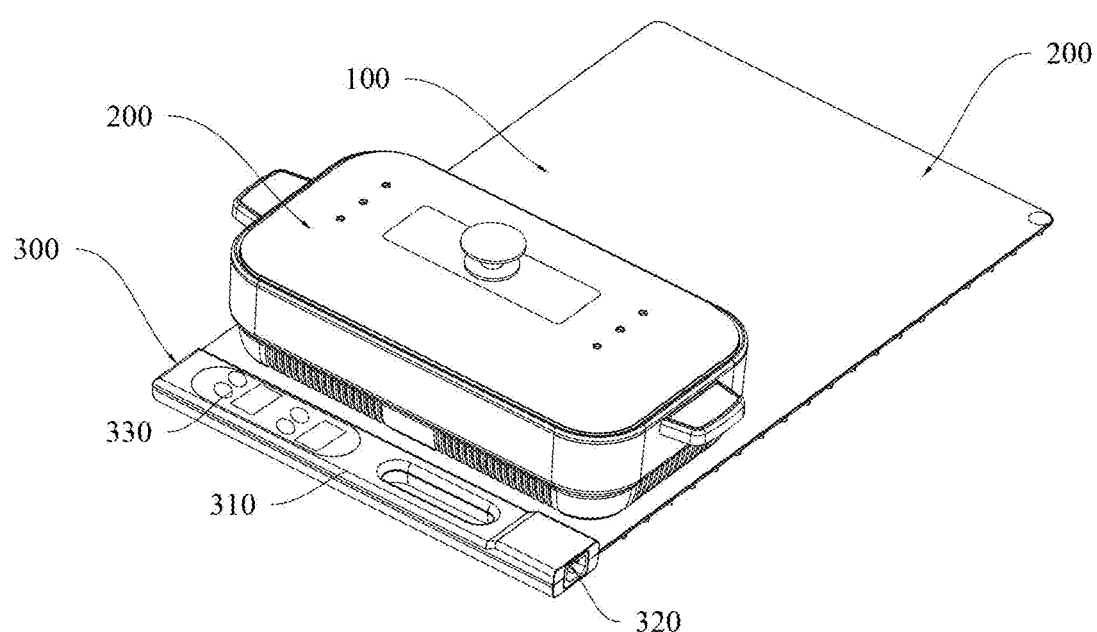
FIG. 9 is a schematic diagram of an Embodiment 2 of a flexible heating device provided by the present application.
Figure 10:
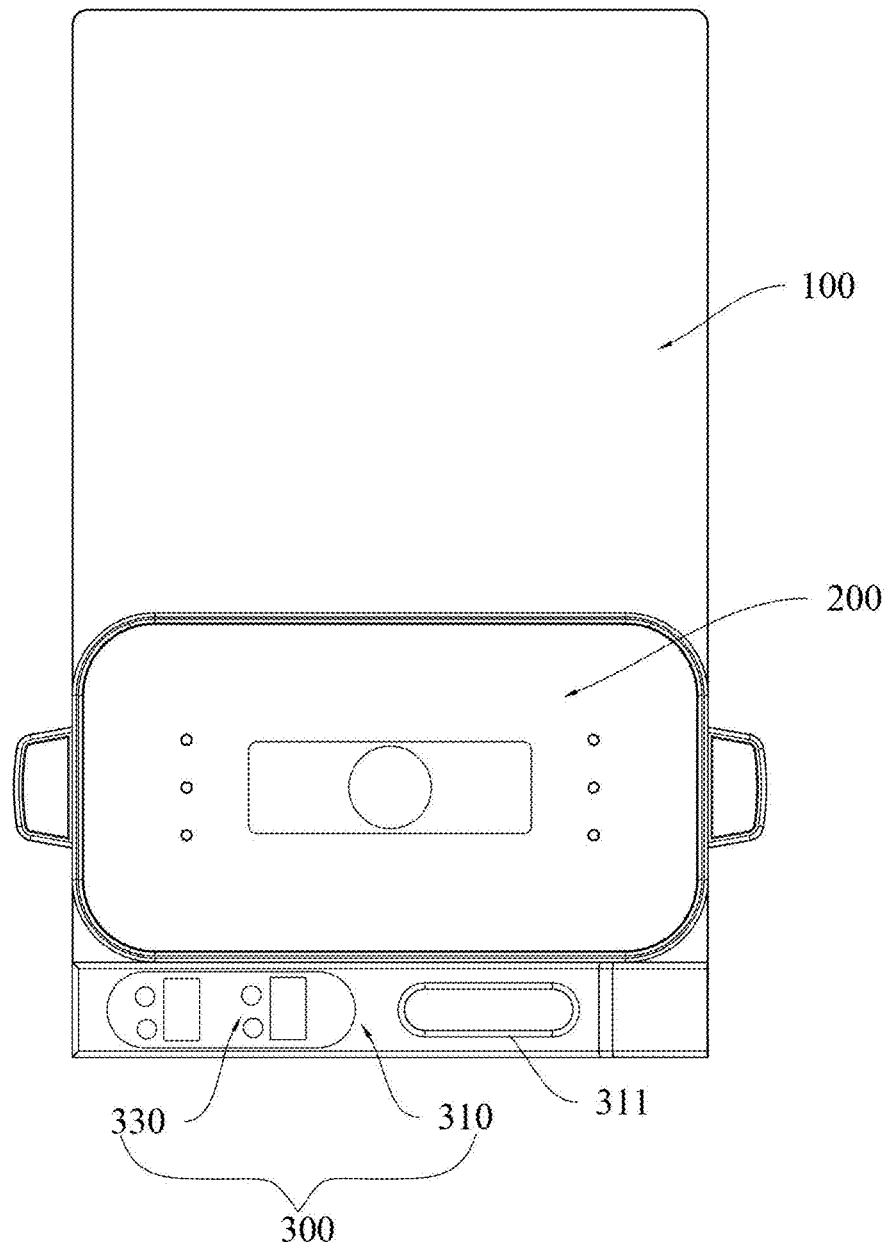
FIG. 10 is a top view of a flexible heating device shown in FIG. 9.
Figure 11:
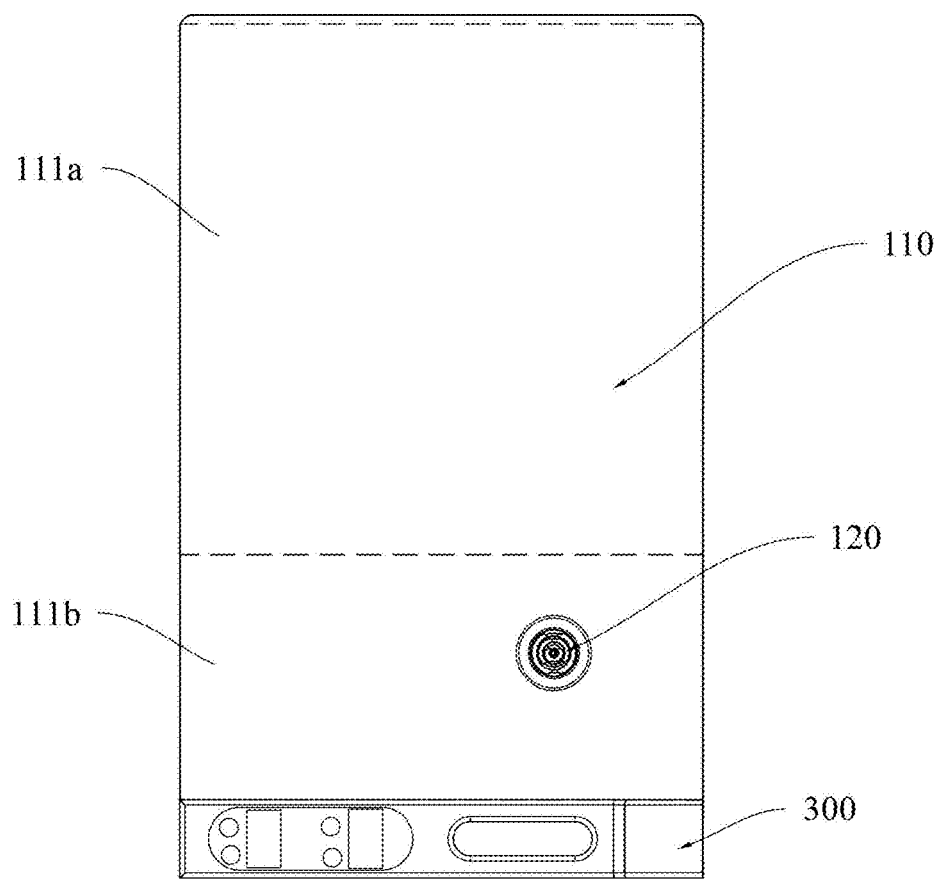
FIG. 11 is a top view of a flexible heating plate and a power supply connecting module of a flexible heating device shown in FIG. 9.
Figure 12:
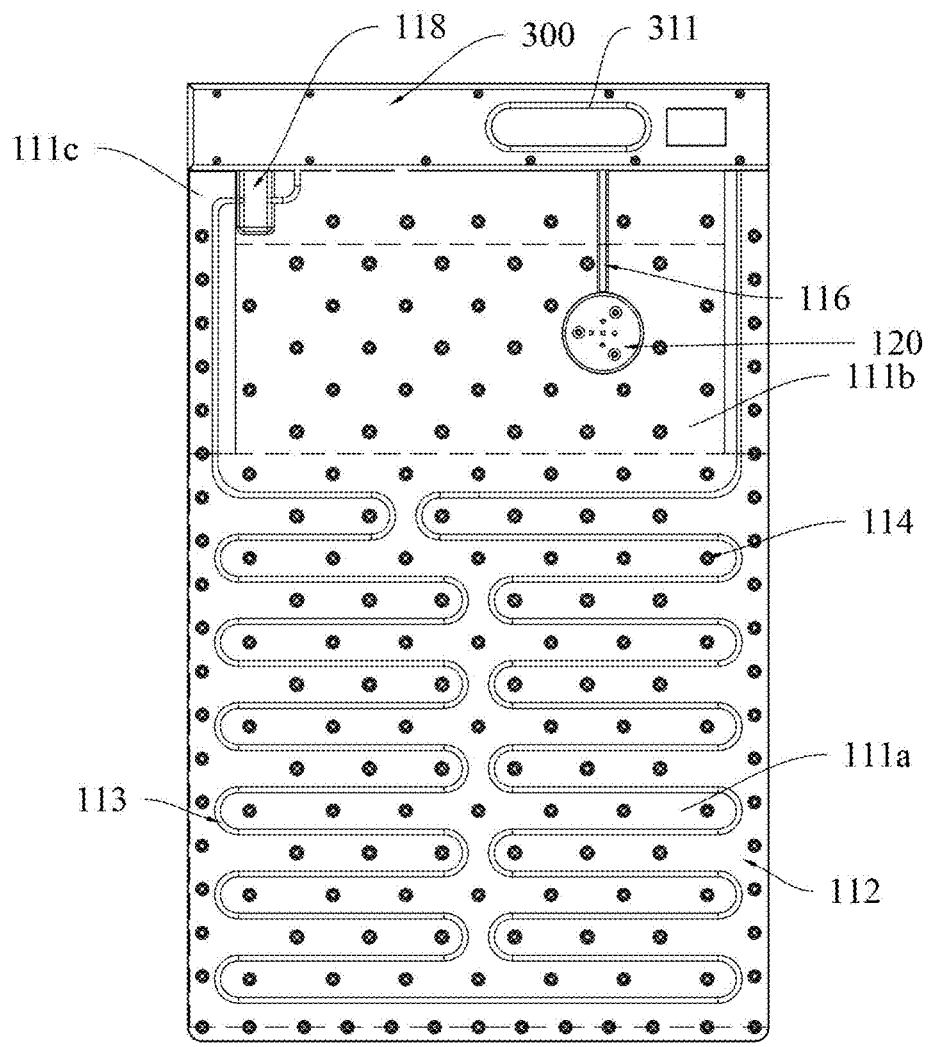
FIG. 12 is a bottom view of a flexible heating plate and a power supply connecting module of a flexible heating device shown in FIG. 9.

As shown in FIG. 7 and FIG. 8, in the embodiment, the silicone pad 110 includes a silicone layer 112 and first convex ribs 113, the first convex ribs 113 are formed on the bottom surface of the silicone layer 112 and cover the outer side of the first electric heating wire 130, and the silicone layer 112 and the first convex ribs 113 are integrally molded.

In an existing production process of the silicone pad, generally, a layer of silicone sheet is placed on a plane, then the electric heating wire is placed on the silicone sheet, and then another layer of silicone sheet is pressed, so that the two silicone sheets clamp the heating wire in an interlayer mode, the thickness is high, the weight is heavy, the production speed is low; and moreover, due to that the two layers of silicone sheets are adopted, the production cost is greatly increased.

According to the embodiment, the first convex ribs 113 wrapping the first electric heating wire 130 are arranged on the bottom surface of the silicone layer 112, and the first convex ribs 113 and the silicone layer 112 are integrally molded, so the effect of fixing the first electric heating wire 130 can be achieved. According to the present application, the first electric heating wire 130 can be fixed only by the silicone layer 112 and the first convex rib 113 which are integrally molded, and fixing glue or other fixing members do not need to be additionally provided, so that the structure is simple, the thickness of the silicone pad 110 is smaller, the processing flow is simple and convenient, the self-weight of the silicone pad 110 is reduced, and the production cost is reduced.

In the embodiment, the first electric heating wire 130 is integrally molded and fixed to the silicone pad 110 by mold pressing, one silicone layer 112 is provided, and the first convex ribs 113 are formed by integrally hot-pressing the first electric heating wire 130 on the bottom surface of the silicone layer 112 through mold pressing.

When preparing and producing the silicone pad 110 in the embodiment, firstly, the first electric heating wire 130 is placed in a lower mold of a forming die according to a preset shape, then one silicone sheet is taken out and placed at a reserved position in the lower mold, at the moment, the silicone sheet is placed above the first electric heating wire 130, then a plastic film on the silicone sheet is removed, the forming die is started, an upper mold and the lower mold are combined, and the silicone sheet and the first electric heating wire 130 are heated; after the silicone sheet is heated, the first convex ribs 113 matched with the first electric heating wire 130 in shape are formed according to the reserved shape in the die (namely, integrally hot-pressing by mold pressing), and the first convex ribs 113 wrap the outer side of the first electric heating wire 130, thus the first electric heating wire 130 is fixed to the silicone pad 110 and prevented from being exposed, which realizes waterproof protection for the first electric heating wire 130.

According to the embodiment, one silicone layer 112 is provided, and compared with a mode of attaching two layers of silicone sheets to fix the electric heating wire, in the embodiment, the silicone pad 110 has the advantages of being lighter and thinner and free of glue failure or damage after being bent for multiple times. Because the first electric heating wire 130 is fixed in the silicone pad 110 in a hot pressing mode, the connection between the first electric heating wire 130 and the silicone pad 110 is more stable and reliable, and the stability and the quality of the flexible heating plate 100 are better.

In the embodiment, the silicone pad 110 further includes supporting legs 114 which are arranged on the bottom surface of the silicone layer 112.

Specifically, the supporting legs 114 have the effects of supporting the silicone layer 112 and insulating heat. The silicone pad 110 can be placed on a table top by the supporting legs 114.

In the embodiment, the supporting legs 114 are made of silicone materials.

In the embodiment, the supporting legs 114 and the silicone layer 112 are integrally molded.

In the embodiment, anti-skid grooves are formed in the ends, away from the silicone layer 112, of the supporting legs 114, so that the silicone pad 110 is not prone to sliding when placed on the table top, and the safety of the device in the using process is ensured.

In the embodiment, the height of the supporting legs protruding out of the silicone layer 112 is larger than that of the first convex ribs 113 protruding out of the silicone layer 112. Specifically, the portions, protruding out of the silicone layer 112, of the supporting legs 114 form a heat dissipation space below the silicone layer 112, which can also avoid a situation that the first electric heating wire 130 in the first convex ribs 113 produces heat to damage the table top, and the heat insulation effect is achieved.

In the embodiment, at least four supporting legs 114 are provided, and the first electric heating wire 130 is arranged in gaps among the supporting legs 114 in a winding mode.

As shown in FIG. 1 to FIG. 4, in the embodiment, the electric heating appliance 200 includes a heat insulation protection shell 210, and an electric heating inner container 220 which is mounted on the heat insulation protection shell 210, the heat insulation protection shell 210 is provided with a socket which is detachably connected to the electric connecting base 120; and when the electric heating appliance 200 is plugged in the electric connecting base 120, the electric heating inner container 220 is electrically connected to the electric connecting base 120.

Specifically, the heat insulation protection shell 210 is located between the electric heating inner container 220 and the silicone pad 110 to play a role of heat insulation and protection. The electric heating inner container 220 is used for containing and heating food.

In the embodiment, a heat dissipation cavity 211 is formed in the heat insulation protection shell 210 and is located between the bottom of the heat insulation protection shell 210 and the bottom of the electric heating inner container 220, and air holes 212 are formed in the side wall of the heat dissipation cavity 211.

Specifically, the heat dissipation cavity 211 can dissipate heat of the electric heating inner container 220, which prevents heat from being accumulated in the electric heating appliance 200, and high-temperature air can be exhausted from the heat dissipation cavity 211 through the air holes 212, thereby prolonging the service life of the electric heating appliance 200.

In the embodiment, the bottom surface of the heat insulation protection shell 210 is made of a plastic material, and the bottom surface of the part, located in the appliance area 111b, of the silicone layer 112 is a plane.

Specifically, when the electric heating appliance 200 is placed in the appliance area 111b, the heat insulation protection shell 210 of the electric heating appliance 200 is attached to the top surface of the silicone layer 112 of the silicone pad 110, and the bottom surface of the part, located in the appliance area 111b, of the silicone layer 112 is a plane, that is, no electric heating wire is arranged on the part, located in the appliance area 111b, of the silicone pad 110, so that the heat insulation protection shell 210 is prevented from being damaged when the electric heating wire produces heat.

In the embodiment, the power supply connecting module 300 includes a shell 310, a power interface 320 and a temperature control assembly 330, in which, the temperature control assembly 330 is mounted on the shell 310, the power interface 320 is arranged on the shell 310 and electrically connected to the temperature control assembly 330, and the temperature control assembly 330 is electrically connected to the first electric heating wire 130 and the electric connecting base 120.

Specifically, the user can perform temperature control on the first electric heating wire 130 and the electric heating appliance 200 on the electric connecting base 120 by means of the temperature control assembly 330, thus regulating the temperature of the silicone pad 110 and the heating temperature of the electric heating appliance 200.

In the embodiment, the temperature control assembly 330 includes a first temperature control knob 331, a first display screen 332, a second temperature control knob 333 and a second display screen 334, in which, the first temperature control knob 331 is electrically connected to the first display screen 332, the second temperature control knob 334 is electrically connected to the second display screen 334, the first temperature control knob 331 is electrically connected to the first temperature control knob 331, and the second temperature control knob 333 is electrically connected to the electric connecting base 120.

Specifically, the first temperature control knob 331 is configured to set the heating temperature of the first electric heating wire 130, the first display screen 332 is configured to display the set temperature of the first electric heating wire 130, the second temperature control knob 333 is configured to set the heating temperature of the electric heating appliance 200, and the second display screen 334 is configured to display the set temperature of the electric heating appliance 200. According to the embodiment, the first temperature control knob 331 and the second temperature control knob 333 are arranged to achieve independent temperature control and regulation for the first electric heating wire 130 and the electric heating appliance 200.

As shown in FIG. 3 to FIG. 6, in the embodiment, the silicone pad 110 is provided with an installation hole 115 and a wiring channel 116, the electric connecting base 120 is fixedly mounted in the installation hole 115, and the wiring channel 116 is arranged between the installation hole 115 and the shell 310.

Specifically, when the electric connecting base 120 is mounted in the installation hole 115, a connection wire of the electric connecting base 120 and the power supply connecting module is mounted in the wiring channel 116, and the wiring channel 116 separates the wire of the electric connecting base 120 from the first electric heating wire 130.

In the embodiment, the height of the supporting feet 114 protruding out of the bottom surface of the silicone layer 112 is larger than the height of the wiring channel 116 protruding out of the bottom surface of the silicone layer 112.

In the embodiment, the wiring channel 116 and the silicone layer 112 are integrally molded.

Figure 4:
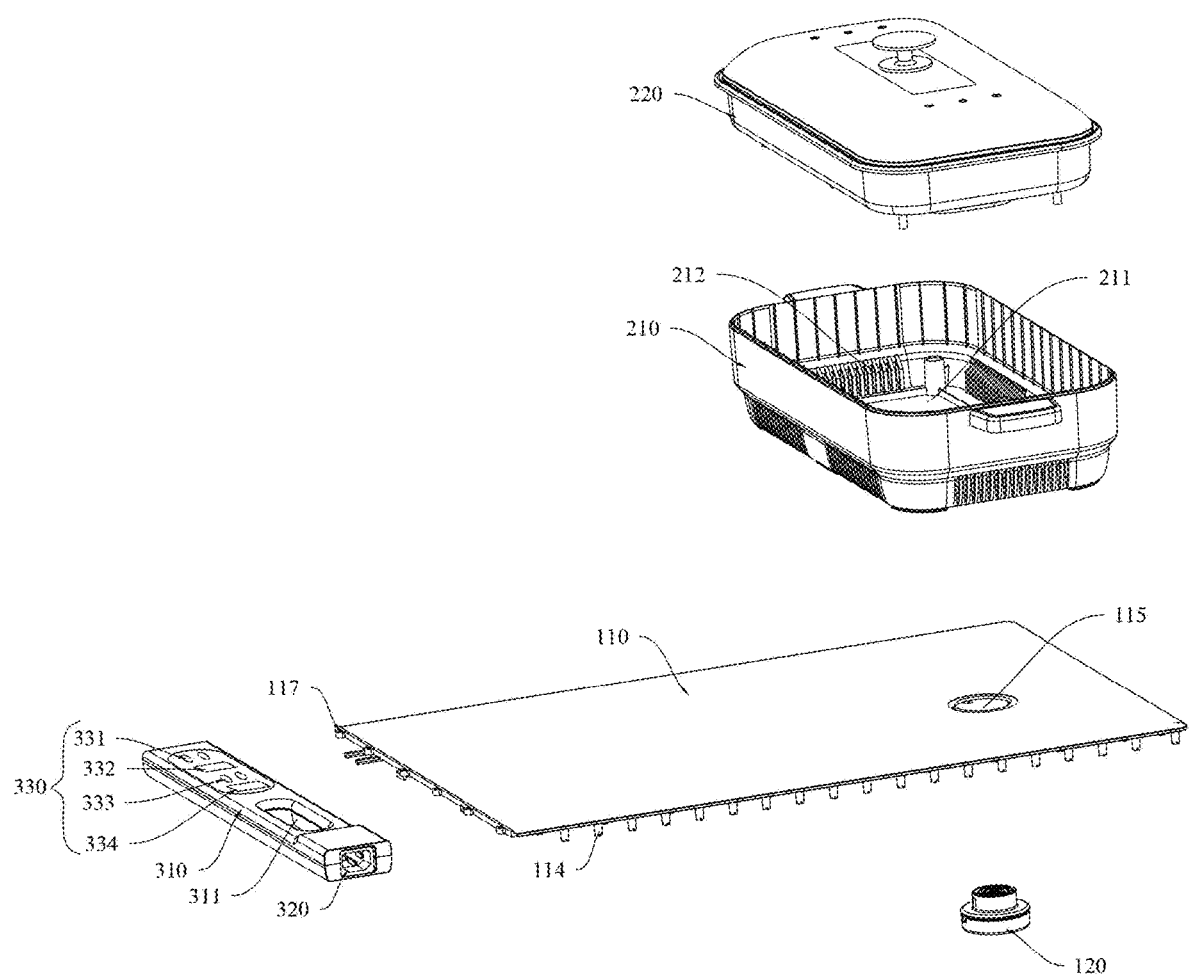
FIG. 4 is an exploded structural diagram of a flexible heating device shown in FIG. 1.
Figure 5:
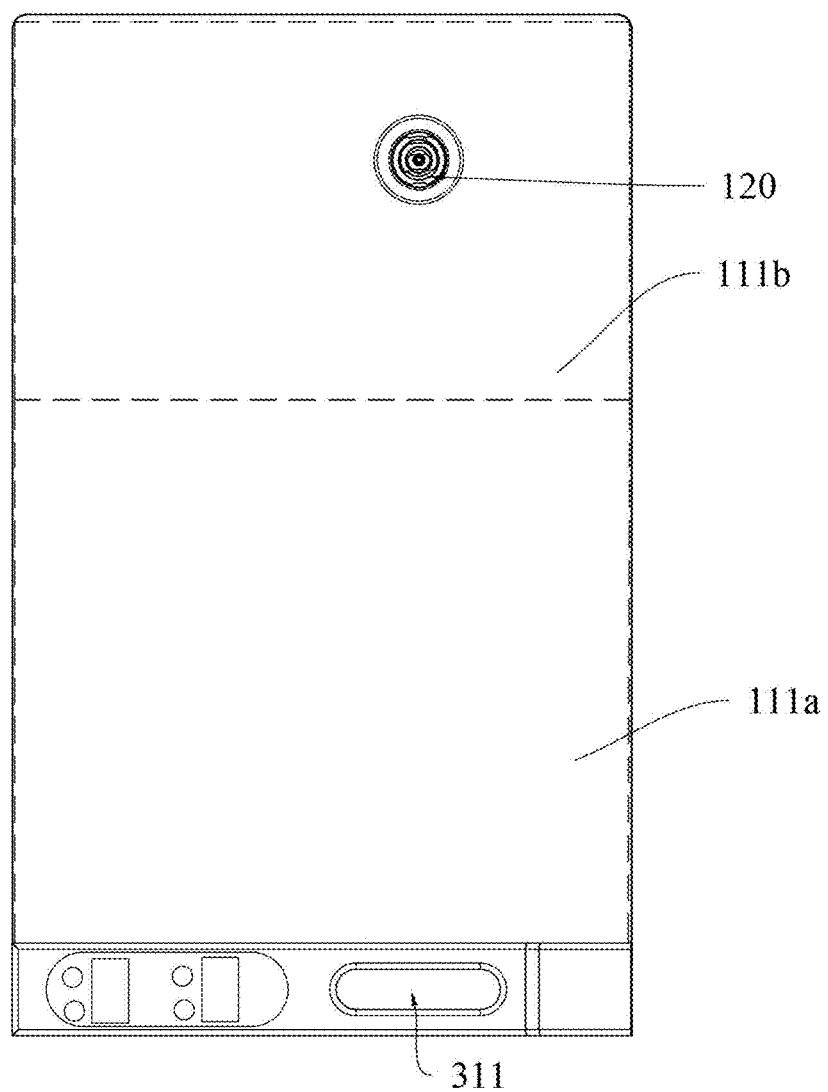
FIG. 5 is a top view of a flexible heating plate and a power supply connecting module in a flexible heating device shown in FIG. 1.

As shown in FIG. 4, in the embodiment, a connection ring 117 is formed on the side, close to the shell 310, of the silicone pad 110; the connection ring 117 is located in the shell 310 and is arranged corresponding to a screw hole in the shell 310; and the shell 310 and the connection ring 117 are fixedly connected by a screw.

Specifically, the screw penetrates through the screw hole in the shell 310 and the connection ring 117, and therefore the shell 310 is fixed to one side of the silicone pad 110.

As shown in FIG. 3 to FIG. 6, in the embodiment, the shell 310 is further provided with a handle groove 311 which penetrates through the shell 310.

Specifically, the handle groove 311 is arranged, which facilitates a user to carry the flexible heating device, so that the flexible heating device can be used at home and can also be carried outdoors for camping cooking, and the application scene of the device according to the present application is widened. With the handle groove 311, the user can store the flexible heating device according to the present application in a hanging mode.

In the embodiment, the heating area 111a is located between the appliance area 111b and the power supply connecting module 300.

Specifically, the heating area 111a is closer to the power supply connecting module 300 than the appliance area 111b, so that the first electric heating wire 130 of the heating area 111a can be electrically connected to the power supply connecting module 300 without bypassing the appliance area 111b, the use amount of the first electric heating wire 130 can be saved, and the production cost is reduced.

As shown in FIG. 7 and FIG. 8, in the embodiment, the flexible heating plate 100 further includes a temperature sensing element 150 which is mounted on the silicone pad 110 and is connected to the first electric heating wire 130.

Specifically, the temperature sensing element 150 is configured to monitor the temperature of the first electric heating wire 130 in real time; and when the temperature of the first electric heating wire 130 is higher than a safe temperature range, the first electric heating wire 130 is disconnected to a power supply, thereby ensuring safe use of the device.

In the embodiment, second convex ribs 118 are arranged on the bottom surface of the silicone layer 112 and wrap the outer side of the temperature sensing element 150; and the second convex ribs 118 and the silicone layer 112 are integrally molded.

Specifically, the temperature sensing element 150 is fixed to the silicone pad 110 by means of the second convex rib 118, so that on one hand, the firmness degree of connection between the temperature sensing element 150 and the first electric heating wire 130 is improved, and on the other hand, the tightness of connection between the temperature sensing element 150 and the first electric heating wire 130 is improved, thereby improving the sensitivity of temperature monitoring of the temperature sensing element 150.

Figure 3:
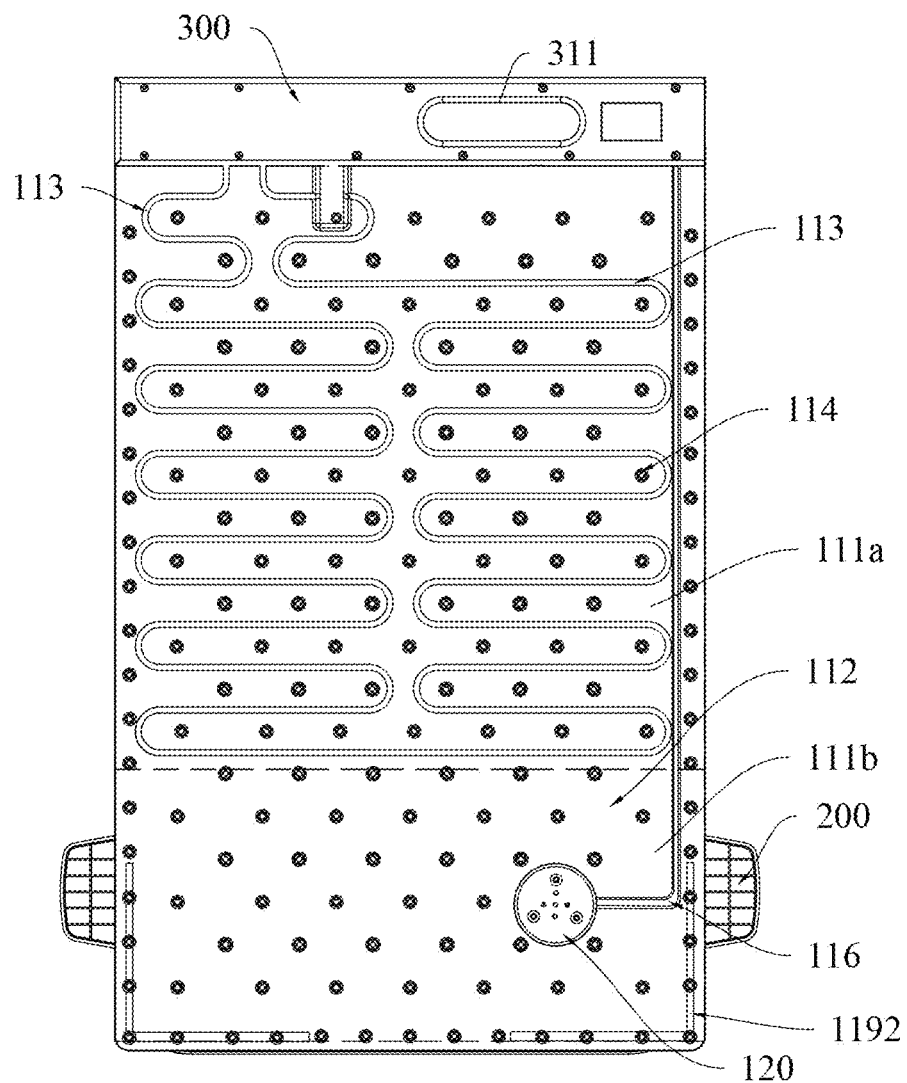
FIG. 3 is a bottom view of a flexible heating device shown in FIG. 1.
Figure 6:
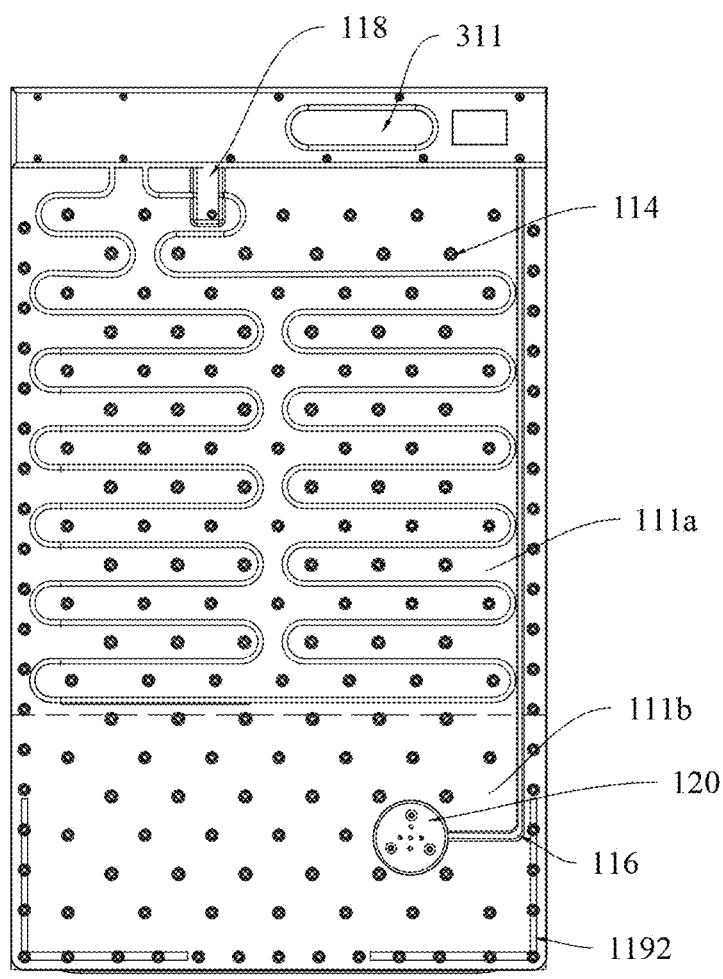
FIG. 6 is a bottom view of a flexible heating plate and a power supply connecting module in FIG. 5.

As shown in FIG. 3 and FIG. 6, in the embodiment, the silicone pad 110 is provided with corner reinforcing ribs 1192 which are formed on the bottom surface of the silicone layer 112 and located on the side, away from the temperature control assembly 330, of the silicone pad 110.

Specifically, the corner reinforcing ribs 1192 are connected to at least three supporting legs 114 closest to the corner of the silicone pad 110, and the corner reinforcing ribs 1192 can improve the anti-deformation capacity of the silicone pad 110, so that the corner of the silicone pad 110 is smoother and not prone to bending deformation or cracking.

Embodiment 2 of Flexible Heating Device in the Present Application

This embodiment is similar to the Embodiment 1, and this embodiment is different from the Embodiment 1 in the positions of the heating area 111a and the appliance area 111b.

As shown in FIG. 9 to FIG. 12, in the embodiment, the heating area 111a is located on the side, away from the electric connecting module, of the appliance area 111b.

Specifically, the appliance area 111b is located between the heating area 111a and the power supply connecting module 300. In this embodiment, a wiring area 111c is further arranged between the heating area 111a and the power supply connecting module 300 and is located on at least one side of the appliance area 111b, and the first electric heating wire 130 is located in the heating area 111a and the wiring area 111c. Specifically, the first electric heating wire 130 located in the heating area 111a is configured to heat the silicone pad 110, and the first electric heating wire 130 located in the wiring area 111c is configured to connect the power supply connecting module 300 with the first electric heating wire 130 located in the heating area 111a. The wiring area 111c is arranged on the silicone pad 110, so that the first electric heating wire 130 can be arranged by bypassing the appliance area 111b, and the situation that heat of the first electric heating wire 130 is transmitted to the electric heating appliance 200 to damage the electric heating appliance 200 is avoided.

In the embodiment, the thickness of the silicone layer 112 located in the wiring area 111c is larger than that of the silicone layer 112 located in the heating area 111a, so that the temperature of the part, in the wiring area 111c, of the silicone pad 110 when the first electric heating wire 130 conducts heating is decreased.

Embodiment 3 of Flexible Heating Device in the Present Application

This embodiment is similar to the Embodiment 1, and this embodiment is different from the Embodiment 1 in the positions of the heating area 111a and the appliance area 111b.

In the embodiment, the heating area 111a surrounds the appliance area 111b. Specifically, the heating area 111a is arranged around the appliance area 111b, and therefore the flexible heating device can achieve the effects that cooking is conducted in the middle of the silicone pad 110, and heat preservation and heating can be conducted around the electric heating appliance 200; and the flexible heating device can be suitable for occasions of hot pots or multiple people having dinner together.

Embodiment 4 of Flexible Heating Device in the Present Application

Figure 13:
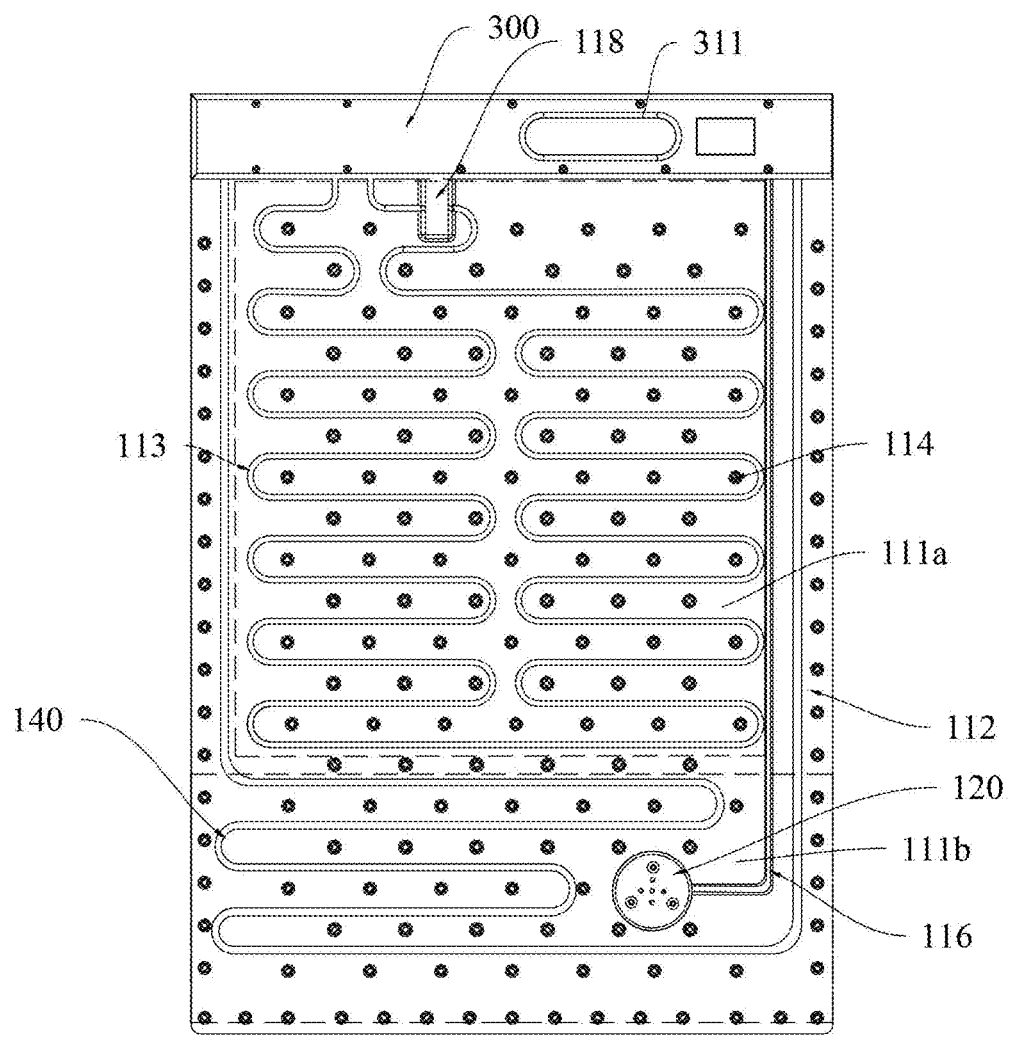
FIG. 13 is a bottom view of a first implementation mode of a flexible heating plate and a power supply connecting module in an Embodiment 4 of a flexible heating device provided by the present application.
Figure 14:
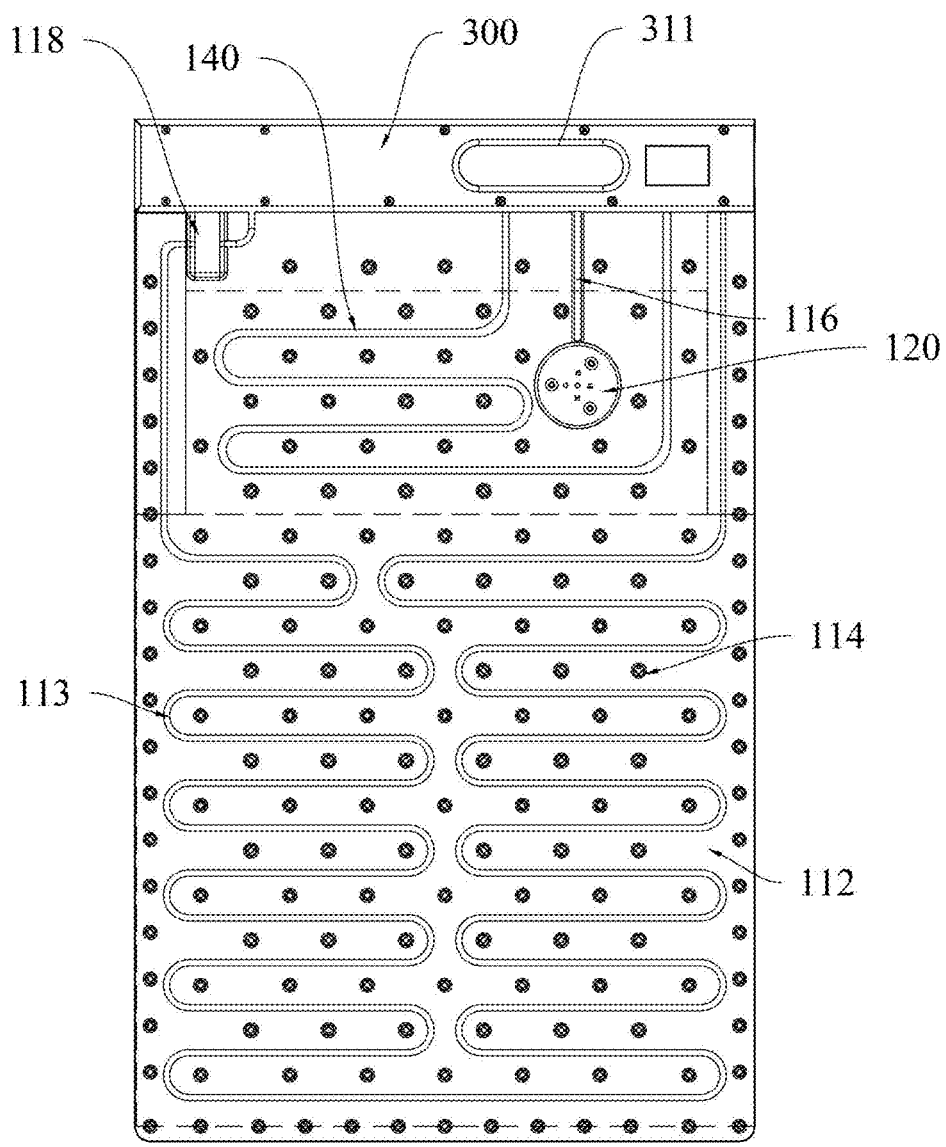
FIG. 14 is a bottom view of a second implementation mode of a flexible heating plate and a power supply connecting module in an Embodiment 4 of a flexible heating device provided by the present application.
Figure 15:
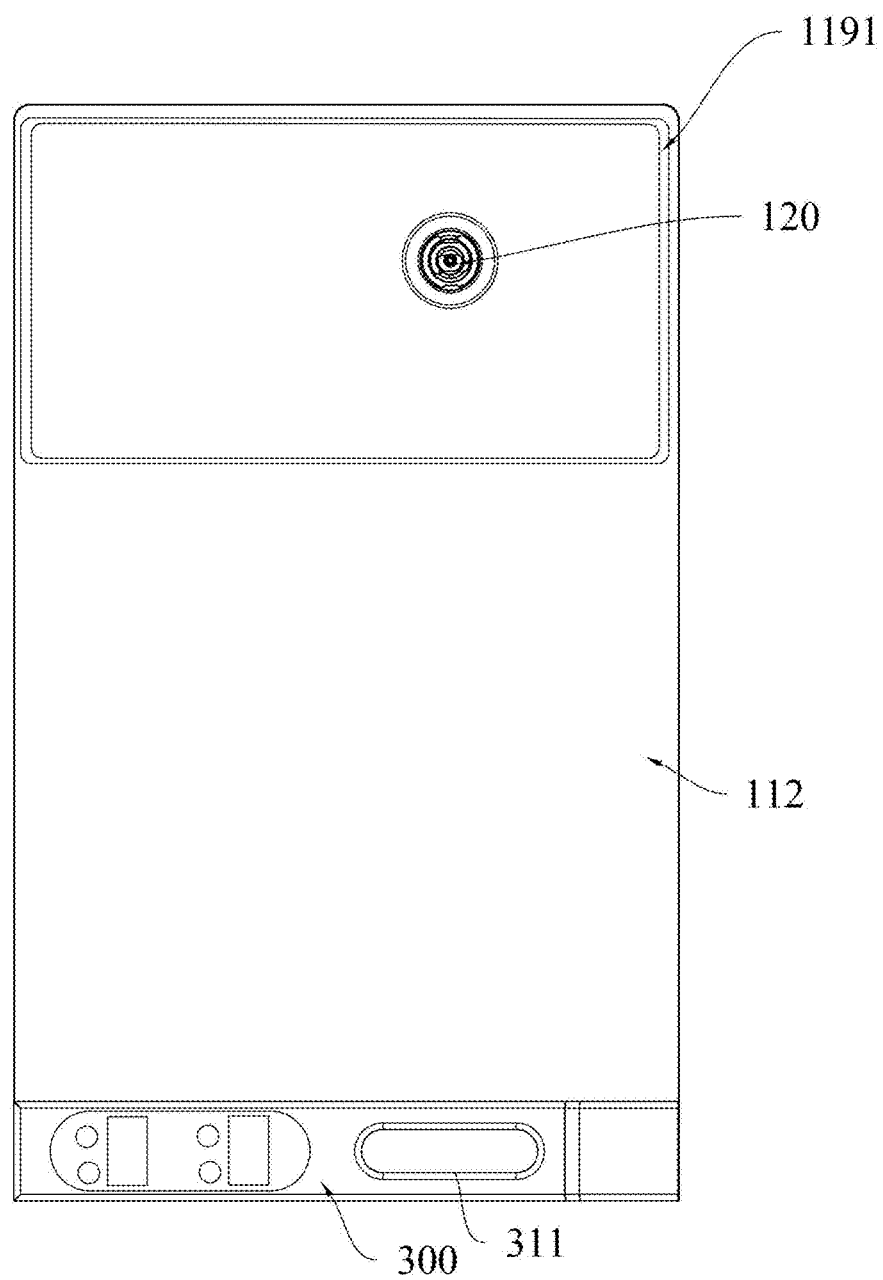
FIG. 15 is a top view of a flexible heating plate and a power supply connecting module shown in FIG. 14.

As shown in FIG. 13 to FIG. 15, this embodiment is similar to the Embodiment 1, the Embodiment 2 and the Embodiment 3, and is different from the Embodiment 1 in that:

the flexible heating plate 100 further includes a second electric heating wire 140 which is fixed to the silicone pad 110 and located in the appliance area 111b, and the second electric heating wire 140 is electrically connected to the electric connecting module.

Specifically, in the embodiment, the second electric heating wire 140 is further arranged in the appliance area 111b, the second electric heating wire 140 and the first electric heating wire 130 operate independently, and when the electric heating appliance 200 is not placed in the appliance area 111b, the second electric heating wire 140 can heat the appliance area 111b, thereby expanding the heating range of the silicone pad 110; and when the electric heating appliance 200 is connected to the electric connecting base 120, the electric connecting base 120 detects the connection of the electric heating appliance 200 and then feeds the connection to the power supply connecting module 300, so that the second electric heating wire 140 can be powered off to prevent the second electric heating wire 140 from continuing to heat to damage the electric heating appliance 200.

In the embodiment, a separation protrusion 1191 is further arranged on the surface, facing the electric heating appliance 200, of the silicone pad 110, and the separation protrusion 1191 is located at a junction of the heating area 111a and the appliance area 111b. Specifically, the separation protrusion 1191 is arranged on the silicone pad 110, so that the user can more clearly know the appliance area 111b, and can accurately place the electric heating appliance 200 in the appliance area 111b, thereby avoiding the damage caused by that a part of the electric heating appliance 200 is located in the heating area 111a.

The specific embodiments of the present application are described in detail above. The above embodiments revealed in the present application are only preferred embodiments of the present application, and many variations and improvements can be made for those of ordinary skill in the art without departing from the conception of the present application. These variations and improvements fall within the scope of protection limited by the claims of the present application.

What is claimed is:

1. A flexible heating device, comprising:
a flexible heating plate comprising a silicone pad, an electric connecting base and a first electric heating wire, wherein the electric connecting base and the first electric heating wire are fixed to the silicone pad, the silicone pad is provided with a heating area and an appliance area, the electric connecting base is located in the appliance area, and the first electric heating wire is located in the heating area;
an electric heating appliance which is detachably in butt joint with the electric connecting base and is electrically connected to the electric connecting base;
a power supply connecting module which is arranged on one side of the flexible heating plate and is electrically connected to the first electric heating wire and the electric connecting base;
the power supply connecting module comprises a shell, a power interface and a temperature control assembly; the temperature control assembly is mounted on the shell; the power interface is arranged on the shell and electrically connected to the temperature control assembly; and the temperature control assembly is electrically connected to the first electric heating wire and the electric connecting base; and
the temperature control assembly comprises a first temperature control knob, a first display screen, a second temperature control knob and a second display screen; and the first temperature control knob is electrically connected to the first display screen, the second temperature control knob is electrically connected to the second display screen, the first temperature control knob is electrically connected to the first electric heating wire, and the second temperature control knob is electrically connected to the electric connecting base.

2. The flexible heating device according to claim 1, wherein the silicone pad comprises a silicone layer and first convex ribs, the first convex ribs are formed on a bottom surface of the silicone layer and cover an outer side of the first electric heating wire, and the silicone layer and the first convex ribs are integrally molded.

3. The flexible heating device according to claim 2, wherein the first electric heating wire is integrally molded and fixed to the silicone pad by mold pressing, and the first convex rib is formed by integrally hot-pressing the first electric heating wire on the bottom surface of the silicone layer through mold pressing.

4. The flexible heating device according to claim 2, wherein the silicone pad further comprises supporting legs which are arranged on the bottom surface of the silicone layer.

5. The flexible heating device according to claim 4, wherein the height of the supporting legs protruding out of the silicone layer is larger than that of the first convex ribs protruding out of the silicone layer.

6. The flexible heating device according to claim 1, wherein the electric heating appliance comprises a heat insulation protection shell, and an electric heating inner container which is mounted on the heat insulation protection shell, the heat insulation protection shell is detachably connected to the electric connecting base; and when the electric heating appliance is plugged in the electric connecting base, the electric heating inner container is electrically connected to the electric connecting base.

7. The flexible heating device according to claim 6, wherein a heat dissipation cavity is formed in the heat insulation protection shell and is located between a bottom of the heat insulation protection shell and a bottom of the electric heating inner container, and air holes are formed in a side wall of the heat dissipation cavity.

8. The flexible heating device according to claim 6, wherein a bottom surface of the heat insulation protection shell is made of a plastic material, and a part of the bottom surface of the heat insulation protection shell located in the appliance area is a plane.

9. The flexible heating device according to claim 1, wherein the silicone pad is provided with an installation hole and a wiring channel, the electric connecting base is fixedly installed in the installation hole, and the wiring channel is arranged between the installation hole and the shell.

10. The flexible heating device according to claim 1, wherein a connection ring is formed on a side, close to the shell, of the silicone pad; the connection ring is located in the shell; and the shell and the connection ring are fixedly connected.

11. The flexible heating device according to claim 1, wherein the shell is further provided with a handle groove which penetrates through the shell.

12. The flexible heating device according to claim 1, wherein the heating area is located between the appliance area and the power supply connecting module.

13. The flexible heating device according to claim 1, wherein the heating area is located on a side, away from the power supply connecting module, of the appliance area.

14. The flexible heating device according to claim 1, wherein the heating area surrounds the appliance area.

15. The flexible heating device according to claim 1, wherein the flexible heating plate further comprises a second electric heating wire which is fixed to the silicone pad and located in the appliance area, and the second electric heating wire is electrically connected to the electric connecting module.

16. The flexible heating device according to claim 1, wherein the flexible heating plate further comprises a temperature sensing element which is installed on the silicone pad and is connected to the first electric heating wire.

17. The flexible heating device according to claim 16, wherein second convex ribs are arranged on a bottom surface of the silicone layer and wrap an outer side of the temperature sensing element; and the second convex ribs and the silicone layer are integrally molded.

18. The flexible heating device according to claim 1, wherein a separation protrusion is further arranged on the surface, facing the electric heating appliance, of the silicone pad, and the separation protrusion is located at a junction of the heating area and the appliance area.

* * * * *